(12) United States Patent
Jutila et al.

(10) Patent No.: US 8,747,692 B2
(45) Date of Patent: *Jun. 10, 2014

(54) SUBSTANCE COMPOSITION AND METHOD FOR MELTING ICE AND PREVENTING SLIPPERINESS AND USE OF BETAINE FOR MELTING ICE AND PREVENTING SLIPPERINESS

(71) Applicants: Kirsti Jutila, Espoo (FI); Hannu Paananen, Kantvik (FI); Ville Alatyppö, Talma (FI); Juhani O. Kuusisto, Forssa (FI)

(72) Inventors: Kirsti Jutila, Espoo (FI); Hannu Paananen, Kantvik (FI); Ville Alatyppö, Talma (FI); Juhani O. Kuusisto, Forssa (FI)

(73) Assignee: Dupont Nutrition Biosciences ApS, Copenhagen K (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/755,897

(22) Filed: Jan. 31, 2013

(65) Prior Publication Data

US 2013/0140484 A1 Jun. 6, 2013

Related U.S. Application Data

(63) Continuation of application No. 13/251,944, filed on Oct. 3, 2011, now Pat. No. 8,388,858, which is a continuation of application No. 12/299,410, filed as application No. PCT/FI2007/050254 on May 7, 2007, now Pat. No. 8,029,692.

(30) Foreign Application Priority Data

May 5, 2006 (FI) .................................. 20065295

(51) Int. Cl.
C09K 3/18 (2006.01)
C09K 3/14 (2006.01)

(52) U.S. Cl.
CPC . *C09K 3/18* (2013.01); *C09K 3/185* (2013.01); *C09K 3/149* (2013.01)
USPC .............................................. 252/70; 106/13

(58) Field of Classification Search
USPC ............................................ 106/13; 252/70
See application file for complete search history.

(56) References Cited

U.S. PATENT DOCUMENTS

| | | | |
|---|---|---|---|
| 5,079,036 A | 1/1992 | Roe et al. | |
| 6,039,890 A | 3/2000 | Ossian et al. | |
| 6,080,330 A | 6/2000 | Bloomer | |
| 6,294,104 B1 | 9/2001 | Ilves et al. | |
| 6,596,189 B1 | 7/2003 | Moles et al. | |
| 6,855,673 B2 | 2/2005 | Cotter et al. | |
| 8,029,692 B2 * | 10/2011 | Jutila et al. ............. | 252/70 |
| 8,388,858 B2 * | 3/2013 | Jutila et al. ............. | 252/70 |
| 2003/0136940 A1 | 7/2003 | Sapienza et al. | |
| 2004/0079919 A1 | 4/2004 | Sapienza et al. | |

FOREIGN PATENT DOCUMENTS

| | | |
|---|---|---|
| EP | 1 034 231 | 9/2000 |
| EP | 1 553 151 | 7/2005 |
| JP | 9132772 | 5/1997 |
| JP | 10 183105 | 7/1998 |
| JP | 2001515092 | 9/2001 |
| JP | 2001-346559 A | 12/2001 |
| JP | 2004059850 | 2/2004 |
| JP | 2004510031 | 4/2004 |
| SU | 1 664 808 | 7/1991 |
| WO | WO 98/26032 | 6/1998 |

OTHER PUBLICATIONS

Finnish Search Report dated Dec. 11, 2006.
International Search Report dated Sep. 4, 2007.
U.S. Office Action mailed Mar. 10, 2010 in related case, U.S. Appl. No. 12/299,410.
U.S. Office Action mailed Oct. 25, 2010 in related case, U.S. Appl. No. 12/299,410.
Supplementary European Search Report mailed Feb. 24, 2012 in corresponding International Application No. EP 07730741.
Translation of Japanese Office Action mailed Nov. 14, 2012 in corresponding Japanese Patent Application No. 2009-508410.
U.S. Office Action mailed Jan. 9, 2012 in parent case, U.S. Appl. No. 13/251,944.
U.S. Office Action mailed Jul. 19, 2012 in parent case, U.S. Appl. No. 13/251,944.
U.S. Notice of Allowance mailed Oct. 31, 2012 in parent case, U.S. Appl. No. 13/251,944.

* cited by examiner

*Primary Examiner* — Anthony J Green
(74) *Attorney, Agent, or Firm* — Scully, Scott, Murphy & Presser, P.C.

(57) ABSTRACT

The invention relates to a combination of compounds for de-icing and/or anti-skid treatment, which combination comprises betaine and at least one other de-icing agent, which has been selected from the group consisting of acetates, formates, urea and combinations thereof. The invention also relates to a method of de-icing and/or anti-skid treatment, wherein a combination of compounds selected from the group consisting of acetates, formats, urea and combinations thereof, are applied to a slippery surface or a surface vulnerable to slipperiness. The invention further relates to the use of betaine for de-icing and/or anti-skid treatment, when betaine is used in combination with at least one other de-icing agent, which has been selected from the group consisting of acetates, formates, urea and combinations thereof.

22 Claims, No Drawings

SUBSTANCE COMPOSITION AND METHOD FOR MELTING ICE AND PREVENTING SLIPPERINESS AND USE OF BETAINE FOR MELTING ICE AND PREVENTING SLIPPERINESS

CROSS-REFERENCE TO RELATED APPLICATIONS

This application is a continuation of U.S. patent application Ser. No. 13/251,944 filed on Oct. 3, 2011, now U.S. Pat. No. 8,388,858, which is a continuation of U.S. patent application Ser. No. 12/299,410 filed on Nov. 3, 2008, now issued as U.S. Pat. No. 8,029,692 on Oct. 4, 2011, which is a National Stage Entry of PCT International Application No. PCT/FI2007/050254 filed on May 7, 2007, which claims the benefit of Finnish Patent No. 20065295 filed on May 5, 2006, the entire contents of each of which are incorporated herein by reference.

FIELD OF THE INVENTION

The present invention relates to a substance composition comprising betaine for melting ice and/or preventing slipperiness, or, in other words, for de-icing and anti-skid treatment. The invention also relates to a method for melting ice and/or preventing slipperiness by using the substance composition in question, as well as the use of betaine for the same purpose.

BACKGROUND OF THE INVENTION

The prevention of ice-formation and slipperiness is extremely important at airports in order to maintain safe conditions for take-off and landing as well as for general aviation safety. The most important requirement for the anti-skid treatment at airports is ensuring aviation safety by maintaining sufficient friction on the asphalt surface of the runway. There is a certain friction requirement for runway paving, and this must be fulfilled whenever there is air traffic at the airport. The coefficient of friction is a constant that describes the interface between two solid substances, and it expresses the amount of friction present as the bodies slide against each other. The coefficient of friction is always more than zero and in practice always less than one. As far as the friction requirement at airports is concerned, the value must usually be at least 0.3, preferably 0.4.

Mechanical methods are primarily used for anti-skid treatment on runways. Chemical melting agents are required for removing the hoarfrost and ice formed on the runway surface, as well as for anticipatory anti-skid treatment. In general, ice-melting agents are used for the anti-skid treatment, optionally with added thickeners in order to increase viscosity, as well as water, surfactants and corrosion inhibitors. The purpose of the ice-melting and anti-skid agents is to disrupt and weaken the adhesion of the ice to the surface of pavement, after which the surface can more easily be mechanically cleaned.

For the prevention of slipperiness on roads, chlorides have mainly been used as ice-melting and anti-skid agents. The substances that are used in road maintenance, such as sodium chloride, could not be used at airports, since they rapidly rust and erode the metal parts of the planes as well as airport equipment. In addition, chlorides have a harmful effect on groundwater quality, soil, vegetation and soil microfauna. Traditionally, water-soluble organic compounds such as urea have been used for melting ice at airports. However, the use of urea has largely been given up, since it has been found to cause significant environmental damage, especially due to nitrogen's eutrophicating effect. As a result of the use of urea, oxygen depletion may occur in groundwaters, increasing the dissolution rate of heavy metals. At present, acetates, liquid potassium acetate and solid sodium acetate, as well as formates, potassium formate and sodium formate, are used at airports. In comparison to chlorides and urea, acetates and formates are less detrimental to the environment. Acetates and formates are effective in melting ice, but their drawback comprises the heavy corrosion of metals and electrical equipment. After the introduction of ice-melting agents based on acetate and formate, issues with asphalt pavements have been observed at airports. What is also significant in relation to the present invention is the fact that ice-melting agents based on acetate and formate have been found to cause heavy corrosion in aeroplane materials, including carbon fibre brakes, metal surfaces and mating metal-metal surfaces. All these issues caused by nominal deicing agents increase the risk of aviation safety.

In anticipatory slipperiness prevention, liquid ice-melting agent has been found to be the most usable form of an ice-melting agent, since a solid and often granular ice-melting agent is easily carried away from the intended surface under the influence of air flows. Further, the effect of granular ice-melting agent is very local, and therefore the effect starts fairly slowly and the applied amount is substantially higher than when a liquid or wetted substance is used. Liquid ice-melting agent is more easily distributed over the entire surface, thus covering a substantially larger proportion of the pavement surface than a solid substance. Previously, liquid substances comprising about 50% water have usually been used for the removal of hoarfrost and thin ice. To remove thicker ice, granular substances are required, which melt the ice down to the surface of the runway if necessary, after which the surface is cleaned by snowploughing or brushing. At present, liquid substances are mainly used (nearly 80% of all substances used) for the anti-skid treatment at airports, since a thick layer of ice is rarely allowed to form on the runway.

As a result of better understanding, environmental considerations and especially the accumulation of chemicals and their effect on the environment have gained increased significance. Especially in view of the environmental considerations concerning the former ice-melting agents, there is a great need for developing novel ice-melting agents that possess the efficacy necessary in the prevention of slipperiness.

EP 1034231 discloses a composition for anti-skid treatment in which aqueous solution comprising 10-60% betaine or its derivatives is used as an anti-freezing agent for runways and as an anti-skid agent for runways.

U.S. Pat. No. 6,596,189 discloses a liquid-based anti-freezing composition for airport runways, the composition exhibiting a minimal catalytic oxidative effect on carbon-carbon fibre composite brakes. This composition comprises mixtures of alkali and alkali earth metal carboxylates and alcohols, into which additional corrosion inhibitors have been added.

BRIEF DESCRIPTION OF THE INVENTION

The invention relates to a substance composition for melting ice and/or preventing slipperiness, the composition comprising a combination of betaine and another ice-melting agent selected from the group consisting of acetates, formates, urea and mixtures thereof. The combination of the invention is an effective de-icing and/or anti-skid combination of betaine and said other ice-melting agent.

In one embodiment of the invention, betaine is present as a solution and at least one other ice-melting agent is present in a solid form. The combined use of a solid and a liquid ice-melting agent is based on that the solid ice-melting agent bores through the ice, reaching the pavement surface, and this makes it possible for the liquid ice-melting agent to run through the formed hole and enter between the ice and the pavement surface, separating the ice from the pavement surface. The composition most preferably comprises a combination of a betaine solution with solid sodium formate and/or sodium acetate.

The invention also relates to a method for melting ice and/or preventing slipperiness, wherein a composition comprising a combination of betaine and another ice-melting agent selected from the group consisting of acetates, formates, urea and mixtures thereof is added to a surface that is slippery or that is liable to become so. The combination is effective in providing de-icing and/or anti-skid treatment of the surface.

Further, the invention relates to the use of betaine for melting ice and/or preventing slipperiness, wherein betaine is used in combination with at least one other ice-melting agent selected from the group consisting of acetates, formates, urea and mixtures thereof. The combination of betaine and said other agent provides a de-icing and/or anti-skid effect.

The composition according to the invention is applied to the desired application target, including airports, roads, bridges, stairs, yards, pavements and ramps, as well as certain special road sections that require anti-skid treatment. Betaine is used in an amount that is sufficient to provide, together with the other ice-melting agent, an efficient effect in regard to melting ice and preventing slipperiness. In a preferred embodiment of the invention, betaine provides a synergistic effect with the said other ice-melting agent. Betaine is also used for diminishing the corrosive effect in melting ice, for diminishing the negative effects of ice-melting agents on the abrasion resistance of the treated target, for diminishing the detrimental effects of ice-melting agents on the environment, for decreasing the effect of ice-melting agents on the wear of the components of the carbon-carbon fibre composite breaks used in aeroplanes, for decreasing the pollution of the groundwaters caused by ice-melting agents and for diminishing the migration of PAH compounds into the environment caused by ice-melting agents.

DETAILED DESCRIPTION OF THE INVENTION

It has been found that the improved effect obtained by the combination of betaine with acetate, formate or urea provides already with a minor amount of the other melting agent an effective ice-melting agent or anti-skid agent, also providing an alternative that is both less corrosive and more environmentally friendly than the previously used ice-melting agents mentioned above. Also the lower toxicity of the combination makes it an excellent alternative for use in anti-skid treatment.

As used herein, the term "composition" refers to one or more substances, which may be in a mixture or separately, independently from each other, in a solid form or as solutions. A typical composition consists essentially of a combination of two active ice-melting and/or anti-skid agents. The term composition includes the application of the said substances on the treated surface simultaneously or separately, however in such a way that the substances are adapted to provide a single de-icing and/or anti-skid action. The best action is provided through the synergistic effect of the said substances. According to the invention, the substances that form the composition, betaine and the said other ice-melting agent in solution and/or as solids, may be mixed either before the application or in connection with the application.

As used herein, the term "betaine" refers to trimethyl glycine, trimethyl glycine monohydrate or the active derivatives thereof. The active derivatives refer to organic salts of trimethyl glycine, such as citrates, acetates and formates, which form betaine in aqueous solutions. Betaine is usually derived from natural sources, for instance extracted from sugar beet or obtained by biochemical processes. Reports show that betaine causes no more corrosion than regular water. The adhesiveness of betaine onto metal surfaces is weak, and it does not cause oxidation of carbon fibre brakes.

As used herein, the term "ice-melting agent" refers to a de-icing substance the purpose of which is to prevent the formation of ice, i.e. to function as an aid in anticipatory anti-skid treatment and/or to melt down and separate already formed ice or hoarfrost, which may then be removed from the surface by mechanical methods, for instance by brushing or snowploughing. The other ice-melting agent referred to in this invention signifies urea, acetates, formates and/or mixtures thereof.

As used herein, the terms "slipperiness prevention" or "anti-skid treatment" refer to those measures the purpose of which is the prevention of surface slipperiness and formation of ice. Slipperiness prevention or anti-skid treatment may also refer to the melting of already formed ice and its removal by chemical or mechanical means.

As used herein, the term "total amount of solids" refers to the total amount of active ingredients present in the combination in a solid form. In the present invention, the amounts of substances have been compared to the total amount as percent by weight.

As used herein, the term "application temperature" refers to that initial temperature of the ice-melting substance combination in which the substance combination is applied to the surface liable to become slippery.

As used herein, the term "airport" mainly refers to runways and taxiways, but it may also comprise other airport outdoor areas.

Betaine and the said other ice-melting agent are present in the substance combination either as a mixture or separately, but they are, however, applied to the surface in such a way that a synergistic effect in regard to a single melting operation is obtained. Betaine and the said other ice-melting agent are, independently from each other, in the form of a solid or a solution. The solvent may comprise water or some other suitable solvent, such as ethanol, or a mixture of solvents. The amount of betaine in the combination is 30-95%, preferably 40-90%, most preferably 50-80%, as calculated on the basis of the total amount of solids. The amount of the other ice-melting agent in the combination is 5-70%, preferably 10-60%, most preferably 20-50%, as calculated on the basis of the total amount of solids.

Most preferably, the invention relates to the combination of solid sodium formate with betaine solution. The amount of betaine in the combination is 30-60%, preferably 40-50%, as calculated on the basis of total amount of solids, and the amount of solid sodium formate is 40-70%, preferably 50-60%, as calculated on the basis of total amount of solids. Sodium formate significantly increases the melting effect of betaine, and the combination therefore provides a synergistic effect in regard to melting ice and preventing slipperiness. Raising the temperature of the betaine solution during the application step significantly increases the melting efficiency of the combination.

In addition to the above-mentioned compounds, the combination may comprise chloride and/or other substances commonly known in the field. All the individual substances according to the invention have been approved by the SAE Aerospace Material Specification (AMS 1435) standard concerning the relevant chemical.

The combination according to the invention is substantially free of corrosion inhibitors, or the amount of corrosion inhibitors in the combination is substantially smaller than in a corresponding combination that provides a similar ice-melting effect but does not comprise betaine. True to their name, corrosion inhibitors are typically added to anti-freezing agent compositions to slow down or to prevent the corrosion caused by the substances to the surface. In corrosion, the material is damaged due to the effect of the environment, either by dissolving or by otherwise reacting with the surrounding substances.

The temperature of the anti-freezing agent composition may at the beginning of the application be that of the surrounding air, for instance between −20° C. and +10° C., but the inventors have discovered that warming significantly improves the melting efficiency. According to the method referred to in the invention, the temperature of betaine has therefore been raised above atmospheric temperature, for instance between +10° C. and +100° C., a preferable application temperature being between +20° C. and +60° C. When the said other ice-melting agent is applied as a mixture with betaine, the application temperature of the combination is in accordance with the above-presented range.

According to the invention, the amount of the melting agent combination applied on the runway is 5-200 $g/m^2$, preferably 10-50 $g/m^2$. Since the amount of substance required for the anti-skid treatment at airports is usually at least 1-2 tonnes, it is important that the used ice-melting agent is environmentally friendly and safe for the airport crew to handle. The adverse effects caused by the combination according to the invention have been found to be clearly smaller than the adverse effects caused by other, previously-used substances that provide a similar ice-melting effect.

The equipment used for the application of ice-melting chemicals at airports comprises largely the same equipment as is used for road maintenance, i.e. disc and spray applicators. The only difference constitutes the size of the application devices, at airports the size of the applicators is 3-fold as compared to road maintenance equipment. By disc applicators, solids and solutions may be applied simultaneously, whereas a spray applicator can only be used for applying a solution.

The application targets of the invention include airports, roads, bridges, stairs, yards, pedestrian crossings, pavements and ramps as well as certain special road sections that require special attention in the prevention of slipperiness. The most important places as far as the prevention of slipperiness is concerned are those where slipperiness is likely to cause danger. The anti-skid treatment is started immediately whenever a change in the weather conditions might lead to a significant increase in slipperiness.

According to the invention, betaine and the said other ice-melting agent(s) are, independently from each other, applied in a solid form or in the form of a solution. In a preferred embodiment, betaine is applied as a solution and the said other ice-melting agent is applied in a solid form. Preferably, the said solid substance is sodium formate.

The amount of the at least one other ice-melting agent in the combination is sufficient to improve the ice-melting and/or anti-skid effect obtained with betaine. Furthermore, the amount of the said other ice-melting agent is preferably sufficient to produce, in combination with betaine, a synergistic effect in regard to melting ice and preventing slipperiness. In the experiments, it was surprisingly found that even a very small amount of the other ice-melting agent is sufficient to significantly improve the ice-melting capability of the betaine solution and that the combination still provides significant improvements in regard to corrosion and environmental effects.

In combination with the other ice-melting agent, betaine provides several advantages in comparison with other combinations that produce a similar ice-melting effect but do not comprise betaine. The composition has a lower corrosive effect, it has a less negative impact on the abrasion resistance of the application target, especially diminishing damages to coatings, has a smaller detrimental effect to the environment and its effect on the wear of the components of the carbon-carbon fibre composite brakes used in aeroplanes is smaller as compared to other combinations that produce a similar ice-melting effect but do not comprise betaine.

The effect of the betaine combination on diminishing the pollution of groundwaters caused by ice-melting agents is significant. Ice-melting agents are usually water-soluble, and as they are released into nature, they leach into groundwaters, whereby the earlier-used harmful substances cause environmental issues. The pollution of groundwaters by chlorides is a significant problem on busy roads. Therefore, preventing the pollution of groundwaters constitutes an extremely important environmental issue.

The ice-melting agents in use today can cause the migration of PAH compounds into the environment by extracting them from the bitumen that is used as a binder in asphalt. The PAH compounds are polycyclic aromatic hydrocarbons, which accumulate in the food chain. Their most important health hazard comprises their ability to cause cancer. The betaine combination has made it possible to diminish the migration of PAH compounds into the environment caused by the ice-melting agents.

The following examples illustrate the invention and are not intended to limit its scope in any way. The percentages in the examples are calculated by weight, unless otherwise specified.

Example 1

In the test, the melting efficiency of different combinations of ice-melting agents and different mixture ratios were compared to each other in relation to time. The tested combinations consisted essentially of the two ice-melting agents and water. In the test, the penetration efficiency into ice in relation to time was measured by first adding solid substance onto the surface. After 30 minutes, the depth of the hole that had melted into the ice was measured, after which the liquid ice-melting agent was furthermore added. The depth of the hole was measured at 10, 30 and 60 minutes after the addition of the aqueous solution. During the entire test, the test temperature was −2° C. The experiment was ended after 90 minutes, since it is known that ice-melting agent dilutes into the molten ice, its efficiency thus being diminished logarithmically as a function of time.

The experimental solid-liquid substance mixture ratios and the corresponding amounts of substance are presented in Table 1.

TABLE 1

Mixture ratios and amounts of substance in different series.

|  |  | Solid | Liquid |
|---|---|---|---|
| Series 1 | Mixture ratio | 14.2% | 85.8% |
|  | Amount of substance (mg, µl) | 21.45 | 130.05 |
| Series 2 | Mixture ratio | 33.3% | 66.7% |
|  | Amount of substance (mg, µl) | 49.95 | 99.9 |
| Series 3 | Mixture ratio | 60% | 40% |
|  | Amount of substance (mg, µl) | 90 | 60 |

Tables 2-4 present the obtained results and errors (mm).

The melting efficiency of solid sodium formate and aqueous betaine is lower than that of sodium formate alone, but the combination comprising sodium formate and betaine proved fairly efficient at all mixture ratios. The results show that even a minor amount of sodium formate significantly affects the melting efficiency of betaine. The melting efficiency obtained by using a combination of sodium formate with betaine is about 100% higher than the melting efficiency of pure betaine mixture at all mixture ratios.

TABLE 2

Results and errors (mm) for substance mixture comprising 14.2% solid substance and 85.8% liquid solution (50% concentration).

| | | Time (min) | | | | | | | |
|---|---|---|---|---|---|---|---|---|---|
| | | 30 | | 40 | | 60 | | 90 | |
| Solid | Liquid | Result | Error | Result | Error | Result | Error | Result | Error |
| Betaine | Betaine | 2.9 | 0.0 | 4.5 | 0.0 | 5.8 | 0.0 | 7.3 | 0.1 |
| Na-formate | Betaine | 6.4 | 0.1 | 9.1 | 1.3 | 11.1 | 0.8 | 13.4 | 0.5 |
| Na-formate | K-formate | 6.4 | 0.2 | 11.4 | 0.7 | 14.3 | 0.8 | 17.9 | 0.6 |
| Betaine | Xylitol | 3.2 | 0.1 | 4.6 | 0.6 | 5.8 | 1.6 | 6.9 | 2.0 |
| Xylitol | Betaine | 2.4 | 0.2 | 4.8 | 0.1 | 5.7 | 0.2 | 7.1 | 0.2 |

TABLE 3

Results and errors (mm) for substance mixture comprising 33.3% solid substance and 66.7% aqueous solution (50% concentration).

| | | Time (min) | | | | | | | |
|---|---|---|---|---|---|---|---|---|---|
| | | 30 | | 40 | | 60 | | 90 | |
| Solid | Liquid | Result | Error | Result | Error | Result | Error | Result | Error |
| Betaine | Betaine | 4.4 | 0.1 | 5.9 | 0.1 | 7.3 | 0.0 | 8.8 | 0.1 |
| Na-formate | Betaine | 7.4 | 0.8 | 9.3 | 0.7 | 11.7 | 0.1 | 13.0 | 0.2 |
| Na-formate | K-formate | 8.7 | 1.2 | 13.8 | 0.7 | 16.5 | 0.3 | 19.6 | 0.2 |
| Betaine | Xylitol | 4.1 | 0.1 | 5.3 | 0.1 | 6.2 | 0.0 | 7.3 | 0.0 |
| Xylitol | Betaine | 3.7 | 0.1 | 5.1 | 0.1 | 6.8 | 0.0 | 8.1 | 0.5 |

TABLE 4

Results and errors (mm) for substance mixture comprising 60% solid substance and 40% aqueous solution (50% concentration).

| | | Time (min) | | | | | | | |
|---|---|---|---|---|---|---|---|---|---|
| | | 30 | | 40 | | 60 | | 90 | |
| Solid | Liquid | Result | Error | Result | Error | Result | Error | Result | Error |
| Betaine | Betaine | 4.8 | 0.3 | 6.2 | 0.1 | 8.0 | 0.1 | 9.6 | 0.1 |
| Na-formate | Betaine | 9.7 | 1.9 | 13.7 | 2.2 | 16.8 | 4.0 | 20.4 | 4.4 |
| Na-formate | K-formate | 10.8 | 2.3 | 17.0 | 2.0 | 19.7 | 2.7 | 23.1 | 2.5 |
| Betaine | Xylitol | 5.3 | 0.1 | 6.2 | 0.2 | 7.2 | 0.2 | 8.6 | 0.2 |
| Xylitol | Betaine | 4.5 | 0.1 | 5.6 | 0.1 | 7.5 | 0.3 | 9.5 | 0.8 |

Example 2

Normally, the temperature of the ice-melting agents equals the outdoor temperature. This experiment investigated the effect of a warmed ice-melting agent on melting efficiency. The melting efficiencies of substances were studied at the temperatures of 20° C. and 60° C. During the entire test, the test temperature was −2° C. Table 5 presents the results and errors (mm) for warmed substances. Warming affects the melting efficiency of the substances to some extent. The dosages of the substances presented in the table have been calculated such that a same amount of solid melts the ice.

When the application temperature of betaine (50 and 65%) was 60° C., the melting efficiency of the substance was approximately 20-34% higher than the efficiency at an application temperature of 20° C. At an application temperature of 20° C. the melting efficiency of betaine in 60 minutes was 47% of the melting efficiency of potassium formate. At the initial temperature of 60° C. the corresponding proportion was 53%. Warming potassium formate does not result in a similar additional benefit in melting efficiency as by betaine.

Initial warming of the substances affects the melting efficiency of betaine relatively more than that of potassium formate. If initial warming of the substance in used as an aid in slipperiness prevention, additional benefits can be obtained in relation to the melting efficiency of the substance.

TABLE 5

Results and errors (mm) for warmed substances. The betaine solution with 65% concentration was not studied at a substance temperature of 20° C.

| | | Substance temperature 20° C. | | | | | | Substance temperature 60° C. | | | | | |
|---|---|---|---|---|---|---|---|---|---|---|---|---|---|
| | | \multicolumn{12}{c}{Time (min)} |
| | Dosage | 10 | | 30 | | 60 | | 10 | | 30 | | 60 | |
| | (µl) | Result | Error | Result | Error | Result | Error | Result | Error | Result | Error | Result | Error |
| Betaine 50% | 184 | 3.2 | 0.1 | 4.8 | 0.1 | 6.4 | 0.1 | 3.7 | 0.1 | 6.2 | 0.2 | 7.7 | 0.2 |
| Betaine 60% | 151 | 2.8 | 0.1 | 5.2 | 0.1 | 6.1 | 0.1 | 3.8 | 0.0 | 5.9 | 0.1 | 8.2 | 0.1 |
| Betaine 65% | 139 | — | — | — | — | — | — | 3.3 | 0.0 | 6.2 | 0.1 | 9.0 | 0.1 |
| K-formate 50% | 150 | 5.6 | 0.2 | 10.1 | 0.5 | 13.5 | 0.8 | 5.8 | 0.1 | 10.2 | 0.4 | 14.5 | 0.1 |

Example 3

Normally, the temperature of the ice-melting agents equals the outdoor temperature. This experiment investigates the effect of a warmed ice-melting agent combinations on melting efficiency. The melting efficiencies of substance combinations is studied at the temperatures of 20° C. and 60° C. During the entire test, the test temperature is −2° C. Table 6 present the results (mm). Warming affects the melting efficiency of the substances to some extent. The concentrations of pure betaine and potassium formate solutions are 50 weight %.

When the application temperature of betaine and potassium formate mixture is 60° C., the melting efficiency of the substance is clearly higher than the efficiency at an application temperature of 20° C. If initial warming of the substance in used as an aid in slipperiness prevention, additional benefits can be obtained in relation to the melting efficiency of the substance.

TABLE 6

Results (mm) for warmed substances. The combination of 65% betaine solution with 35% K-formate is not studied at a substance temperature of 20° C.

| | Substance temperature 20° C. | | | Substance temperature 60° C. | | |
|---|---|---|---|---|---|---|
| | \multicolumn{6}{c}{Time (min)} |
| | 10 | 30 | 60 | 10 | 30 | 60 |
| Betaine 50% + K-formate 50% | 4.4 | 7.5 | 10.0 | 4.8 | 8.2 | 11.1 |
| Betaine 60% + K-formate 40% | 3.9 | 7.2 | 9.1 | 4.6 | 7.6 | 10.7 |
| Betaine 65% + K-formate 35% | — | — | — | 4.2 | 7.6 | 10.9 |

Example 4

In the test, the melting efficiency of different combinations of ice-melting agents and different mixture ratios were compared to each other in relation to time. In the test, the penetration efficiency into ice in relation to time was measured by adding liquid substance mixtures onto the surface. The depth of the hole was measured at 10, 30 and 60 minutes after the addition of the liquid solution. During the test, the temperature was either −2° C. or −10° C.

The concentrations of potassium formate and betaine solutions were 50 weight-%. The mixture of sodium chloride and betaine contained 23 weight-% NaCl and 50 weight-% betaine, because the freezing point of a NaCl solution is at the lowest at a concentration of 23 weight-% and it is used widely in de-icing work. Tables 7 and 8 show the dry content of the compounds and also the real calculated concentrations (% by weight). Mixtures of betaine and potassium formate were effective in melting the ice. However betaine does not have a considerable effect on the melting efficiency of sodium chloride.

TABLE 7

The melting efficiency (mm) of different combinations of ice-melting agents in −2° C.

| Solution mixture | Concentration (mass-%) | 10 min | 30 min | 60 min |
|---|---|---|---|---|
| Betaine 10%/K-Formate 90% | 50 | 6.6 | 11.5 | 15.9 |
| Betaine 25%/K-Formate 75% | 50 | 5.3 | 8.9 | 12.3 |
| Betaine 33%/K-Formate 66% | 50 | 4.7 | 7.9 | 12.0 |
| Betaine 10%/NaCl 23% 90% | 25.7 | 2.8 | 5.7 | 8.3 |
| Betaine 25%/NaCl 23% 75% | 29.75 | 3.3 | 6.3 | 8.7 |
| Betaine 33%/NaCl 23% 66% | 31.68 | 3.6 | 5.7 | 7.8 |

TABLE 8

The melting efficiency (mm) of different combinations of ice-melting agents in −10° C.

| Solution mixture | Concentration (mass-%) | 10 min | 30 min | 60 min |
|---|---|---|---|---|
| Betaine 10%/K-Formate 90% | 50 | 3.3 | 4.8 | 5.6 |
| Betaine 25%/K-Formate 75% | 50 | 2.8 | 4.2 | 4.6 |
| Betaine 33%/K-Formate 66% | 50 | 2.6 | 4.3 | 4.8 |
| Betaine 10%/NaCl 23% 90% | 25.7 | 1.7 | 2.2 | 2.5 |
| Betaine 25%/NaCl 23% 75% | 29.75 | 1.3 | 2.1 | 2.4 |
| Betaine 33%/NaCl 23 mass-% 66% | 31.68 | 1.2 | 2.1 | 2.3 |

Example 5

In this test, the melting efficiency of different combinations of ice-melting agents and different mixture ratios were compared to each other in relation to time in a similar manner as in Example 3. In the test, the penetration efficiency into ice in relation to time was measured in millimeters (mm) by adding liquid substance mixtures onto the surface. The depth of the hole was measured at 10, 30 and 60 minutes after the addition of the liquid solution. During the test, the test temperature was −2° C. all the time.

TABLE 9

The melting efficiency (mm) of different combinations of ice-melting agents in −2° C.

| Solution mixture | Concentration (mass-%) | 10 min | 30 min | 60 min |
|---|---|---|---|---|
| Betaine 77%/Na-Formate 23% | 50 | 3.9 | 6.5 | 9.1 |
| Betaine 85%/Na-Formate 15% | 50 | 3.6 | 5.9 | 8.4 |
| Betaine 95%/Na-Formate 5% | 50 | 3.4 | 5.5 | 7.6 |
| Betaine 77%/Na-Acetate 23% | 50 | 3.0 | 5.3 | 7.2 |
| Betaine 85%/Na-Acetate 15% | 50 | 3.1 | 5.2 | 6.8 |
| Betaine 100% | 50 | 2.7 | 5.1 | 6.5 |

The invention claimed is:

1. A substance composition for melting ice and/or preventing slipperiness, characterized in that the said composition comprises a combination of betaine and an other ice-melting agent selected from the group consisting of formates, urea and mixtures thereof; wherein the amount of betaine in the composition ranges from 10% to 33%, inclusive, based on the total amount of solids present in said composition.

2. A composition according to claim 1, wherein betaine is in the form of a solution and the other ice-melting agent is in the form of a solid.

3. A composition according to claim 2, wherein the combination comprises betaine solution and solid sodium formate.

4. A composition according to claim 1, wherein betaine and the other ice-melting agent are, independently from each other, in a solid form or in the form of a solution.

5. A composition according to claim 1, wherein betaine and the other ice-melting agent are present in the combination either as a mixture or separately, adapted to provide a combined effect.

6. A composition according to claim 1, wherein the combination also comprises chloride.

7. A composition according to claim 1, wherein the amount of the other ice-melting agent in the combination is sufficient to improve the melting ice and/or preventing slipperiness effect obtained by betaine.

8. A composition according to claim 7, wherein the amount of the other ice-melting agent is sufficient to produce, together with betaine, a synergistic effect in regard to melting ice and preventing slipperiness.

9. A composition according to claim 1, wherein the combination exhibits a corrosive effect that is smaller than a combination that produces a similar ice-melting effect but does not comprise betaine.

10. A composition according to claim 1, wherein the combination exhibits a negative effect on abrasion resistance at an application target that is smaller as compared to a combination that produces a similar ice-melting effect but does not comprise betaine.

11. A composition according to claim 1, wherein the other ice-melting agent is formate.

12. A composition according to claim 1, wherein the other ice-melting agent is potassium formate.

13. A method for melting ice and/or preventing slipperiness, characterized in that a substance composition comprising a combination of betaine and an other ice-melting agent selected from the group consisting of acetates, formates, urea and mixtures thereof is added to a slippery surface or a surface that is liable to become slippery; wherein the amount of betaine in the composition ranges from 10% to 33%, inclusive, based on the total amount of solids present in said composition.

14. A method according to claim 13, wherein betaine is applied as a solution and the other ice-melting agent is applied in the form of a solid.

15. A method according to claim 13, wherein betaine and the other ice-melting agent are, independently from each other, applied in a solid form or in the form of a solution.

16. A method according to claim 13, wherein betaine is applied at a temperature of between −20° C. and 100° C.

17. A method according to claim 13, wherein the amount of the other ice-melting agent is sufficient to improve the melting ice and/or preventing slipperiness effect obtained with betaine.

18. A method according to claim 13, wherein betaine and the other ice-melting agent are applied to the surface simultaneously or separately, adapted to produce a synergistic effect.

19. A method according to claim 13, wherein the other ice-melting agent is selected from the group consisting of acetates, formates, and mixtures thereof.

20. A method according to claim 13, wherein the other ice-melting agent is formate.

21. A method according to claim 13, wherein the other ice-melting agent is potassium formate.

22. A substance composition for melting ice and/or preventing slipperiness, characterized in that the composition comprises a combination of betaine and an other ice-melting agent, the ice-melting agent being an acetate, wherein the amount of betaine in the composition ranges from 10%-30%, inclusive, based on the total amount of solids present in the composition, and wherein the combination exhibits a corrosive effect that is smaller than another combination that produces a similar ice-melting effect but does not comprise betaine.

\* \* \* \* \*